United States Patent [19]

Stauffer

[11] Patent Number: 4,544,114

[45] Date of Patent: Oct. 1, 1985

[54] FISHING REEL WITH ANTIREVERSE AND DIRECT DRIVE FEATURES

[76] Inventor: Norman L. Stauffer, 7177 S. Ulster St., Englewood, Colo. 80112

[21] Appl. No.: 704,146

[22] Filed: Feb. 21, 1985

Related U.S. Application Data

[63] Continuation of Ser. No. 503,664, Jun. 13, 1983, abandoned.

[51] Int. Cl.[4] ............................................. A01K 89/02
[52] U.S. Cl. ................................. 242/213; 242/84.5 R
[58] Field of Search ............... 242/212, 213, 214, 216, 242/221, 84.5 R, 84.51 R; 188/82.34

[56] References Cited

U.S. PATENT DOCUMENTS

| | | | |
|---|---|---|---|
| 1,836,755 | 12/1931 | Hirsch | 242/213 |
| 1,995,221 | 3/1935 | Peel et al. | 242/84.5 R |
| 2,180,566 | 11/1939 | Thompson | 242/84.51 R |
| 2,548,317 | 4/1951 | MacBlane | 242/212 |
| 2,993,660 | 7/1961 | Parks | 242/84.51 R |
| 3,796,395 | 3/1974 | Rankin, Jr. | 242/212 |
| 4,220,294 | 9/1980 | Di Paola | 242/107.4 A |

Primary Examiner—Stuart S. Levy
Assistant Examiner—Katherine Jaekel

[57] ABSTRACT

A fly fishing reel including a frame, a spool for collecting and storing line, a handle to impart rotation to the spool, and a pawl mounted on the spool and arranged to react to the direction of the spool rotation so that positive engagement of the handle and spool is effected when line is being recovered and the handle is disengaged and prevented from rotating with the spool when line is being removed.

8 Claims, 4 Drawing Figures

FISHING REEL WITH ANTIREVERSE AND DIRECT DRIVE FEATURES

This is a continuation of application Ser. No. 503,664, filed June 13, 1983, now abandoned.

BACKGROUND OF THE INVENTION

Heavy duty single action fly reels have been designed for use when fly fishing for strong fish such as Atlantic Salmon, Steelhead, and salt-water species. These reels have increased line capacity, heavier construction, and drags with greater ability to retard line removal. This type of reel is also characterized by drive of the reel spool with a handle directly attached to the spool. This has the advantage of providing direct spool drive when one desires to bring in a stubborn fish. A disadvantage of direct spool drive is the hazard presented by the rapidly revolving handle when a strong fish is quickly removing line.

This disadvantage is overcome in the prior art by an antireverse single action reel. In these reels the handle is prevented from rotating when line is being removed. This is accomplished by driving the spool with a handle which is attached to a frictional brake mechanism. Since this brake mechanism is held in a fixed position when line is removed the handle does not rotate with the spool. When the handle is turned to recover line, friction of the brake mechanism couples the handle motion to the spool. A disadvantage with this type of reel is that there is no longer direct drive of the spool and there is limited line recovery force which can be applied through the brake mechanism. When a greater force is applied, the brake slips and the spool rotates allowing undesired line removal. Although both types of heavy duty single action fly reels have unique features, it is evident that no single reel incorporates both desirable direct drive and the safety of anti-reverse.

SUMMARY OF THE INVENTION

The present invention is a unique single action fly reel mechanism which allows desirable direct reel drive, but prevents dangerous reel handle rotation as line is removed. A further object of this invention is to prevent engagement of direct spool drive under conditions of rapid spool rotation which could prove dangerous. In the present invention the reel handle is arranged to provide controlled direct drive of the spool in the direction of line recovery through a unique spool drive coupling. This coupling can be activated only when the spool is rotated in the line recovery direction. Further, coupling is inhibited from engagement if the spool is turning in the direction of line removal. Positive coupling engagement is terminated when the spool direction of rotation changes from line recovery to line removal. In the line removal condition the adjustable frictional brake drag is operational and may be set to provide the desired line removal resistance. For line recovery the drag is disengaged to allow full recovery force during the aforementioned direct drive condition.

DETAILED DESCRIPTION OF THE PREFERRED EMBODIMENT

Figure 1:
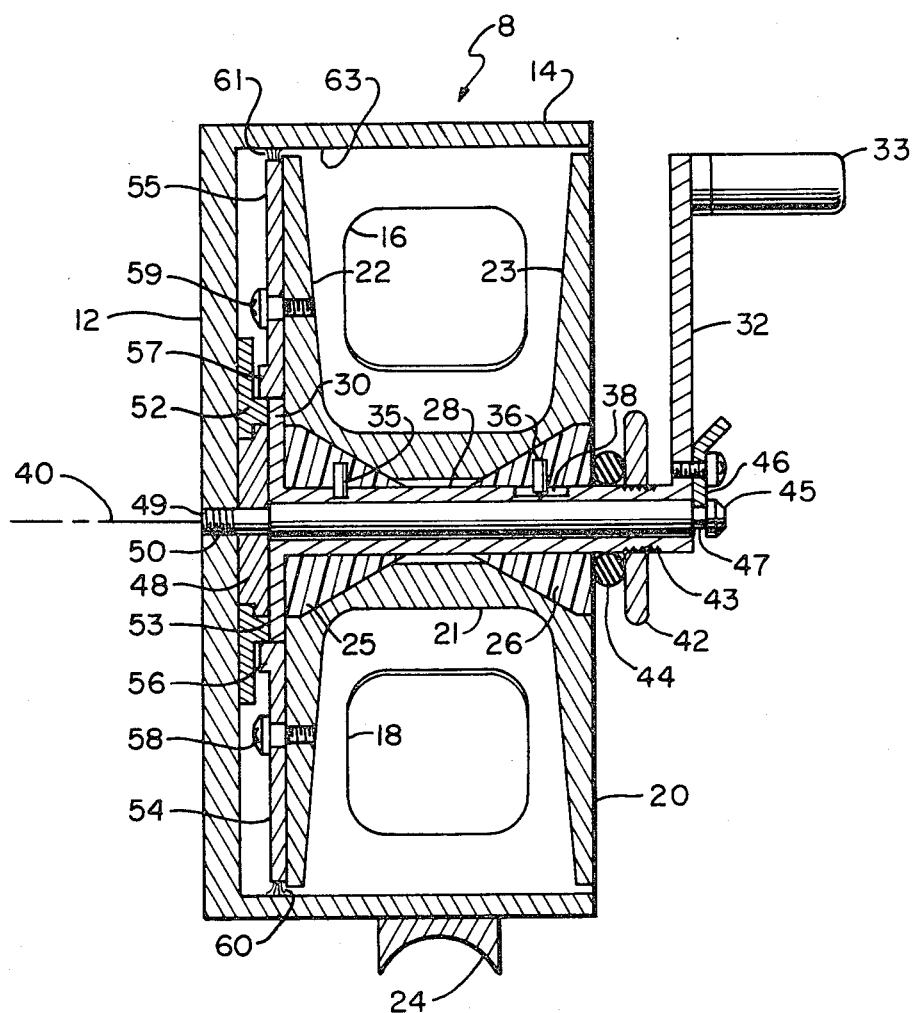
FIG. 1 shows a central cross section of a reel embodying the present invention.

In the Figures, elements that are common to more than one Figure carry the same reference numeral. In FIG. 1 a reel frame 8 is illustrated having a vertical bottom portion or a backplate 12 and a sidewall 14. The sidewall 14 has apertures 16 and 18 to provide for access to a spool member 20 having a spool core 21 and side portions 22 and 23 which provide containment of the fly line (not shown). Also attached to the sidewall 14 is a mounting foot 24 which allows the reel to be attached to a fishing rod reel seat (not shown). The spool core 21 is supported on cone shaped drag bearings 25 and 26. The drag bearings 25 and 26 are mounted on a spool shaft 28 which has on its end nearest the side portion 22 a keyed flange or spool shaft ratchet 30 and on its other end an arm 32 and a reel handle 33. The drag bearing 25 is fixed to the spool shaft 28 with a pin 35. The drag bearing 26 is prevented from rotating on the spool shaft 28 by a pin 36 which fits in a slot 38 in the spool shaft 28. This slot allows the drag bearing 26 to move in a direction parallel to a central axis 40, but prevents rotation of the drag bearing 26 about the spool shaft 28.

The drag bearings 25 and 26 support the spool core 21, but allow the spool member 20 to rotate on the drag bearings 25 and 26. The drag bearings 25 and 26 provide some frictional resistance to rotation of the spool member 20. This frictional resistance may be controlled by adjusting a drag adjustment knob 42 which moves on a threaded portion 43 of the spool shaft 28. Frictional adjusting force is applied from the drag adjustment knob 42 through a pliant member 44, for example a rubber "O" ring, to the drag bearing 26. Since the drag bearing 26 can move in the direction parallel to the axis 40, increased frictional resistance can be applied to the spool core 21 through the action of the drag bearings 25 and 26. The drag bearings 25 and 26 are constructed from a material to provide consistent smooth drag such as Delrin (acetal homopolymer), nylon (polyamide), or Teflon (fluoroplastic).

The spool shaft 28 mounts on a central shaft 45 which allows rotation of the spool shaft 28 about the central axis 40. The spool shaft 28 is retained in position on the central shaft 45 by a catch mechanism 46 which moves into engagement with a relieved portion 47 in the central shaft 45. The central shaft 45 has a flanged disc 48 affixed to one end and a threaded end 49 which serves to mount the central shaft 45 and the flanged disc 48 in a threaded hole 50 in the backplate 12. The flanged disc 48 serves to hold a cam ratchet plate 52 in position, but not so firmly as to prevent the cam ratchet plate 52 from rotating about the central axis 40. The cam ratchet plate 52 has a raised cam surface 53. FIG. 1 also illustrates spool pawls 54 and 55, each with a thick portion or raised tab 56 and 57 on one end. The spool pawls 54 and 55 are mounted onto the side portion 22 with mounting screws 58 and 59. The mounting screws 58 and 59 hold the spool pawls 54 and 55 in position lightly against the side portion 22 so as to allow rotation of the spool pawls 54 and 55 about the mounting screws 58 and 59. Affixed to each of the spool pawls 54 and 55 are frictional or brush-like flexible extensions 60 and 61 which are positioned so as to lightly brush or drag on an inner surface 63 of the sidewall 14.

Figure 2:
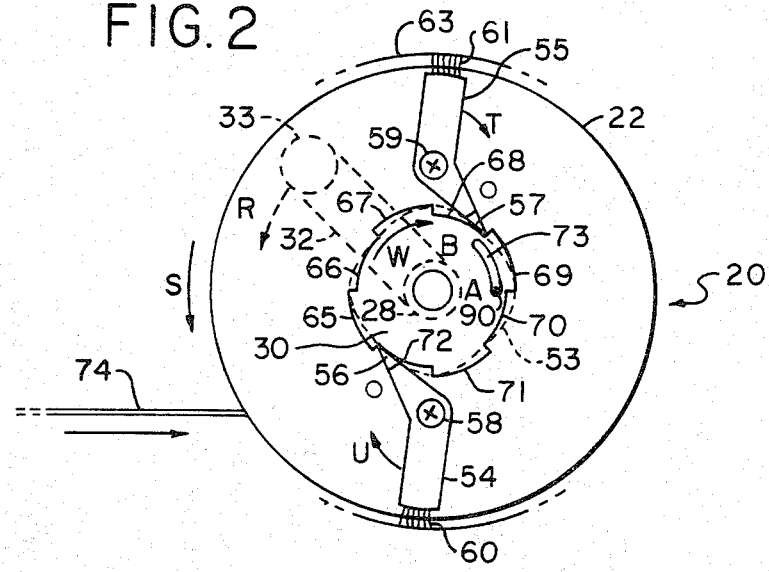
FIG. 2 shows a view of the back side of the reel spool in the condition of line retrieval.

FIG. 2 is a view of the back surface of the side portion 22. Also shown is the spool shaft ratchet 30 at the end of the spool shaft 28. The spool shaft ratchet 30 has a series of raised segments 65, 67, 69 and 71. These are of length approximately equal to the length of intervening relieved portions 66, 68, 70 and 72. Also, the spool shaft ratchet 30 has a slot 73 arranged in an arc covering an angle approximately equal to the length of one of the raised segments 65, 67, 69 and 71 or one of the relieved portions 66, 68, 70 or 72.

The two spool pawls 54 and 55 are illustrated in FIG. 2 with the flexible extensions 60 and 61 in light contact with the inner surface 63. They are mounted on the mounting screws 58 and 59 about which they can rotate freely. Although one spool pawl would be sufficient for operation, two will increase reliability, strength, and provide balance at high spool rotational velocity.

In FIG. 2 the spool pawls 54 and 55 are illustrated in engagement with the relieved portions 68 and 72 of the spool shaft ratchet 30. In this position when the reel handle 33 is turned in the direction indicated by arrow R, torque is transmitted to the spool through the arm 32, the spool shaft 28, through the spool shaft ratchet 30 and then through the spool pawls 54 and 55 to the side portion 22 to which screws 58 and 59 are attached, thus allowing for a line 74 retrieval. Retrieval is possible under conditions of extreme line tension, tension which otherwise could overcome the drag friction of the drag bearings 25 and 26 against the spool core 21. Obviously other means could have been provided between the spool member 20 and the spool shaft 28 to provide positive engagement. For example, cam surfaces might be forced into positive frictional engagement with the outer surface of a disc on the end of the spool shaft 28. Alternately, a clutch might be engaged between the spool shaft 28 and the spool member 20 controlled by the action of a frictional member in contact with the inner surface 63 of the sidewall 14.

Figure 3:
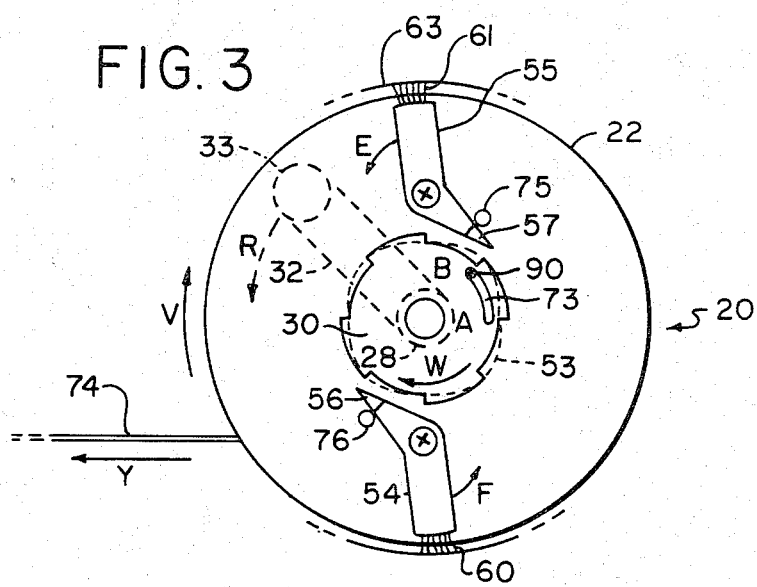
FIG. 3 shows a view of the back side of the reel spool in the condition of line removal.

FIG. 3 illustrates a second, or disengaged position of the spool pawls 54 and 55. Here the spool pawl 55 is resting against a stop pin 75 and the spool pawl 54 is resting against a stop pin 76 so as to allow relative motion of the spool side portion 22 and the spool shaft 28. If the reel handle 33 is held fixed, the spool side portion 22 and thus also the spool member 20 could rotate in the direction indicated by arrow V and allow the line 74 to be removed from the spool member 20 if the frictional resistance of the drag bearings 25 and 26 is overcome.

It is evident that a means of positive engagement of the spool member 20 to the spool shaft 28 and thus the reel handle 33 has been provided. Such positive engagement is useful when retrieving line under great tension as when bringing in a strong fish. It is necessary to have this positive engagement terminated if the reel handle 33 is released by the angler or if the tension is so high as to force reverse motion in the spool member 20 and the reel handle 33. Means to provide this feature will be described.

Figure 4:
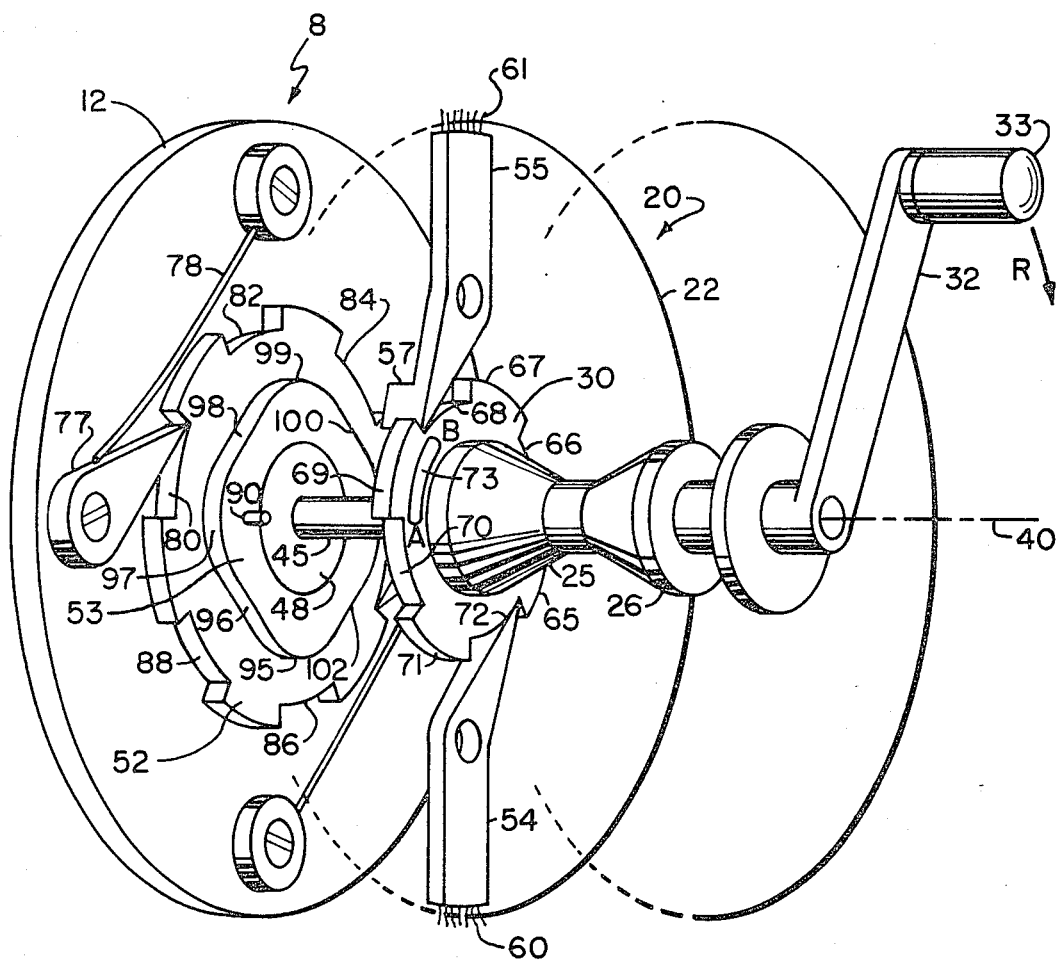
FIG. 4 shows a perspective and partly cut away view of the interior mechanism of the reel with the spool related machanism illustrated in a partially removed position.

In FIG. 4 the spool mechanism is illustrated in partial removed relationship relative to the central shaft 45 and the reel frame 8. The reel side wall 14 is not illustrated in FIG. 4 to clearly show the interior features. The cam ratchet plate 52 can rotate about the central axis 40, but is held in position against the backplate 12 by the flanged disc 48. A frame pawl 77 is arranged to allow continuous rotation of the cam ratchet plate 52 in only one direction. The frame pawl 77 is urged into contact with the outer surface of the cam ratchet plate 52 by a spring 78. Rotation in the inhibited direction is prevented when the frame pawl 77 drops into engagement with a recess or a notch 80, 82, 84, 86 or 88 in the outer surface of the cam ratchet plate 52 after limited rotation of the cam ratchet plate 52. A control pin 90 projects from the raised cam surface 53 portion of the cam ratchet plate 52. When the spool member 20 is in its normal position the control pin 90 fits into the slot 73. When the spool member 20 is turned in either direction motion will be imparted to the cam ratchet plate 52 after the control pin 90 reaches the end of the slot 73. For example if the reel handle 33 is moved in the direction indicated by arrow R to retrieve line then when the control pin 90 reaches an end A of the slot 73 the cam ratchet plate 52 will be put in motion in the same direction. The frame pawl 77 allows motion of the cam ratchet plate 52 in the direction indicated by arrow R. The spool member 20 will rotate in the same direction by virtue of the friction of the drag bearings 25 and 26 against the spool core 21 (not seen in FIG. 4).

In the retrieve condition described above the spool pawls 54 and 55 are urged into engagement with the spool shaft ratchet 30 by the action of the flexible extensions 60 and 61. The flexible extensions 60 and 61 are small flexible extensions at the ends of the spool pawls 54 and 55 located so as to extend beyond the edge of the side portion 22 and lightly contact the inner surface 63 (not seen in FIG. 4). Light friction causes the spool pawls 54 and 55 to rotate in the directions indicated by arrows T and U, note FIG. 2, when the spool member 20 rotates in the direction of arrow S. If tension in the line 74 causes the spool member 20 to slip slightly with respect to the drag bearings 25 and 26 then the spool pawls 54 and 55 will come firmly into contact with the relieved portions 66 and 70 or the relieved portions 68 and 72, of the spool shaft ratchet 30 and prevent further slippage. Thus a means has been disclosed which brings the reel handle 33 into a positive drive condition when line is being retrieved and the spool member 20 is moving in the direction indicated by arrow S. It is also possible that other means besides the flexible extensions 60 and 61 could be used to urge the pawls into engagement with the handle assembly. For example a flexible member might react with teeth or pins on the backplate 12.

A further feature of the positive drive means described herein is that positive engagement is prevented between the reel handle 33 and the spool member 20 when the spool member 20 is rotating in a direction opposite to that indicated by arrow S, FIG. 2. This is illustrated in FIG. 3 where spool number 20 is rotating in a direction V. As seen, the spool pawls 54 and 55 are forced against the stop pins 75 and 76 by the action of the flexible extensions 60 and 61 which cause the spool pawls 54 and 55 to rotate in the direction indicated by arrows E and F. Thus engagement of the spool pawls 54 and 55 with the spool shaft ratchet 30 is prevented.

When the spool member 20 is rotating in the direction indicated by arrow S in FIG. 2, the control pin 90 is in position A in the slot 73. A cam surface 53 is rigidly affixed to the cam ratchet plate 52, and is in close proximity to the spool shaft ratchet 30, note FIG. 4. In FIG. 4, the cam surface 53 is shown to have an equal number of maximum height regions 95, 97, 99 and 101 and lower regions 96, 98, 100 and 102 corresponding to the number of raised and relieved segments on the spool shaft ratchet 30. The maximum height region 101 is obscured in FIG. 4. The maximum height regions 95, 97, 99 and 101 of the cam surface 53 are of such a dimension to be substantially the same distance from the central axis 40 as are the raised segments 65, 67, 69 and 71 of the spool shaft ratchet 30. The lower regions 96, 98, 100 and 102 of the cam surface 53 are substantially the same distance from the central axis 40 as are the relieved portions 66, 68, 70 and 72 of the spool shaft ratchet 30. As seen in FIG. 2, with the control pin 90 at A in the slot 73, each of the lower regions 96, 98, 100 and 102 of the cam surface 53 is adjacent to the end of each of the relieved portions 66, 68, 70 and 72 of the spool shaft ratchet 30 where the spool pawls 54 and 55 come into fixed engagement during positive spool drive, note FIG. 2. The position of the cam surface 53 under these conditions is illustrated by the dashed line in FIG. 2.

If a strong fish starts to remove line from the reel and the user removes his hand from the reel handle 33, the member spool 20 will start to turn in the direction opposite to that indicated by arrow S FIG. 2. The spool pawls 54 and 55 being in firm engagement with the spool shaft ratchet 30 force its motion in a direction indicated by arrow W. As seen in FIGS. 1 and 4, the spool pawls have raised tabs 56 and 57 which extend beyond the surface of the spool shaft ratchet 30 into the region of the cam surface 53. Thus the raised tabs 56 and 57 come into contact with the cam surface 53 and the resulting friction causes motion of the cam ratchet plate 52 in a direction indicated by arrow W, FIG. 2. With the motion of the cam ratchet plate 52 in this direction the frame pawl 77 comes into engagement with the notch 80, 82, 84, 86 or 88 and prevents further rotation of the cam ratchet plate 52 in this direction. The spool pawls 54 and 55 continue to force rotation of the spool shaft ratchet 30 in the direction of arrow W, FIG. 2. The raised tabs 56 and 57 of the spool pawls 54 and 55 being in contact with the surface of the cam surface 53 are forced out of engagement with the relieved portions 66 and 70 or 68 and 72 as the raised tabs 56 and 57 slide up toward the maximum height regions of the cam surface 53. The maximum height regions 95, 97, 99 and 101, FIG. 4, being the same height as the raised segments 65, 67, 69 and 71 of the spool shaft ratchet 30, assures that disengagement of the spool pawls 54 and 55 takes place. FIG. 3 illustrates the condition of the spool pawls 54 and 55 in their out of engagement positions. Rotation of the spool shaft ratchet 30 continues in the direction W, FIG. 3, due to the spool continuing to rotate in direction V and the frictional coupling of the spool member 20 to the drag bearings 25 and 26 affixed to the spool shaft 28. Rotation of the spool shaft ratchet 30 continues until the control pin 90 has reached position B in the slot 73. The cam surface 53 now is in the position indicated by the dashed line in FIG. 3. Further rotation of the spool shaft ratchet 30 and the affixed spool shaft 28 and the reel handle 33 is prevented since the control pin 90 is rigidly attached to the cam ratchet plate 52, the motion of which is prevented by the previous engagement of the frame pawl 77. Now further rotation of the spool member 20 caused by the line 74 removal in the direction of arrow Y, FIG. 3, must overcome the drag which exists between the drag bearings 25 and 26 and the spool member 20.

FIGS. 1, 2, 3 and 4 show a reel which is configured for right hand line retrieval with the reel handle 33. Conversion for left hand retrieval is simply accomplished by reversing the direction of frame pawl 77 so as to arrest motion of the cam ratchet plate 52 for motion in the opposite direction. Also, the spool pawls 54 and 55 would be replaced with pawls which are fabricated to engage the spool shaft ratchet 30 in a direction opposite to that described previously.

Means have thus been disclosed to force the disengagement of the spool pawls 54 and 55 from the spool shaft ratchet 30, the spool shaft 28, and the arm 32, and the reel handle 33 and to prevent their further motion. As the line 74 continues to be removed in direction Y and the spool member 20 rotates in direction indicated by arrow V, FIG. 3, the spool pawls 54 and 55 remain in a condition where they are maintained out of further engagement with the spool shaft ratchet 30 due to the previously discussed action of the flexible extensions 60 and 61 against the inner surface 63. Potentially dangerous engagement of the spool pawls 54 and 55 is thus prevented even if the reel handle 33 is turned in the direction indicated by arrow R, FIG. 3.

It is thus seen that I have provided an improved fly reel employing a novel mechanism to provide positive engagement of handle and spool when required, but preventing handle rotation when the spool is rotating due to rapid line removal. It is evident that the system is easily and inexpensively implemented in single action fly reels. Conversion from right hand retrieve to left hand retrieve is simply accomplished. Many obvious alterations will occur to those skilled in the art and I do not wish to be limited by the specific disclosure used in connection with the preferred embodiment. I intend only to be limited by the following claims.

The embodiments of the invention in which an exclusive property or right is claimed are as follows:

1. A fishing reel comprising:
   a reel frame;
   a spool for collecting and storing line;
   rotation means including a first ratchet wheel attached to and driven by said rotation means;
   a second ratchet wheel mounted so as to rotate with the first ratchet wheel after limited relative rotation, the second ratchet wheel engaging a first pawl to allow rotation in only one direction;
   a second pawl carried on the spool and having a pliant portion in contact with the reel frame which biases the position of the second pawl, in response to the direction of rotation of the spool so that when the spool rotates in a direction to collect line the second pawl comes into contact with the first ratchet wheel to allow positive drive of the spool from the rotation means, and when the spool rotates in a direction to allow line removal, the second pawl is biased to a position which precludes engagement with the first ratchet wheel; and
   a cam surface fixed to the second ratchet wheel to cause disengagement of the second pawl from the first ratchet wheel when the spool rotation is in a direction to remove line.

2. The fishing reel as set forth in claim 1 further comprising drag means to control rotation of the spool as line is removed, the drag means including a frictional element to control the frictional drag between the rotation means and the spool.

3. A fishing reel comprising:
   a reel frame;
   a spool for collecting line;
   a first pawl mounted on the spool and having a pliant portion in contact with the reel frame which biases the first pawl to a first postition when the spool rotates in a direction to collect line, and to a second position when the spool rotates in the direction of line removal;

rotation means including a driven first ratchet wheel which, when rotated, comes into engagement with the first pawl when the first pawl is in its first postion to cause positive drive of the spool, but which does not engage the first pawl when the first pawl is in its second position; and release means including a second ratchet wheel and a second pawl, the second ratchet wheel engaging the second pawl to allow the release means to rotate in only one direction, the release means further including a cam surface which causes disengagement of the first pawl and the first ratchet wheel when the spool rotates in the direction of line removal.

4. The fishing reel as set forth in claim 3 further including a slot in the first ratchet wheel and a pin, the pin attached to the release means and engaging the slot to allow only limited relative rotation of the rotation means and the release means.

5. The fishing reel as set forth in claim 4 further comprising drag means to control rotation of the spool as line is removed, the drag means including a frictional element to control the frictional drag between the rotation means and the spool.

6. A fishing reel comprising:
a reel frame;
a spool for collecting line;
coupling means mounted on the spool and responsive to the direction of rotation of the spool, which is biased to a first position when the spool rotates in a direction to collect line and is biased to a second position when the spool rotates in a direction to remove line;

spool drive means which, when rotated in a line collecting direction, comes into engagement with the direction responsive coupling means when the direction responsive means is in its first position to cause positive drive of the spool, but does not engage the coupling means when the direction responsive coupling means is in its second position; and release means operable to terminate the engagement of the direction responsive coupling means and spool drive means when the spool rotates in the direction of line removal.

7. The fishing reel as set forth in claim 6 wherein the release means includes means to prevent continuous rotation of the spool drive means in the direction of rotation corresponding to the direction of line removal.

8. The fishing reel as set forth in claim 7 further comprising drag means to control rotation of the spool as line is removed, the drag means including a frictional element to control the frictional drag between the rotation means and the spool.

* * * * *